United States Patent [19]
McClimans

[11] Patent Number: 5,984,579
[45] Date of Patent: *Nov. 16, 1999

[54] RESIDUAL BIOTECH SOIL

[76] Inventor: Richard J. McClimans, 139 Winding Way, Camillus, N.Y. 13031

[ * ] Notice: This patent issued on a continued prosecution application filed under 37 CFR 1.53(d), and is subject to the twenty year patent term provisions of 35 U.S.C. 154(a)(2).

[21] Appl. No.: 08/085,102

[22] Filed: Jul. 2, 1993

[51] Int. Cl.$^6$ ............................... G21F 9/28; C05F 11/00
[52] U.S. Cl. ............................ 405/129; 71/8; 71/9; 71/25
[58] Field of Search ......................... 71/8–9, 25; 405/129

[56] References Cited

U.S. PATENT DOCUMENTS 3,877,920  4/1975  Carlberg ....................................... 71/21

FOREIGN PATENT DOCUMENTS

| 60237515 | 10/1985 | Japan | ............................... C05D 9/00 |
| 0237515 | 11/1985 | Japan | ........................................... 71/8 |
| 1186277 | 8/1986 | Japan | ........................................... 71/8 |

OTHER PUBLICATIONS

Hamernik et al., "Properties of Municipal Solid Waste Fly Ash and Their Use in Concrete," Environmental Research Institute, The University of Connecticut, Storrs, CT, Technical Report No. ERI 90–1, pp. 14–18, (1990).

"Proceedings of the First International Conference on Municipal Solid Waste Combustor Ash Utilization," pp. 100–108, Oct. 13–14, 1988.

Keefer et al., "Fly Ash/Soil Mixtures Plus Additives For Field Corn Production," Proceedings of the Seventh International Ash Utilization Symposium and Exposition, Fossil Energy, vol. 1, pp. 94–97, May 1985.

Baker et al., "Utilization Potential Coal Combustion By–Products—Somerset Power Plant Case Study," Prepared for New York State Energy Research and Development Authority and New York State Electric and Gas Corporation, pp. 2–6, Jan. 1987.

Strause, K.D., The Biotechnologic Conversion of Municipal Solid Waste Incinerator Ash and Biologic Sludge into an Anthropogenic Soil, SUNY College of Environmental Science and Forestry, p46, May 1989.

Fitzpatrick, "Evaluation of Potting Mixes Derived From Urban Waste Products" 1982, Hort. Abstracts, pp. 95–97.

*Primary Examiner*—Wayne Langel
*Assistant Examiner*—Melanie Wong
*Attorney, Agent, or Firm*—Heslin & Rothenberg, P.C.

[57] ABSTRACT

Synthetic soil is created by blending processed or unprocessed incinerator ash, derived from solid waste or other materials, with either compostable materials or compostable materials derived therefrom. The blending of these materials results in residual biotech soil which can be used as a plant-growth medium; as cover material for such things as landfills, disturbed soil areas or mined-land reclamation; and as a medium to treat contaminated water.

17 Claims, No Drawings

RESIDUAL BIOTECH SOIL

BACKGROUND OF THE INVENTION

1. Field of the Invention

This invention generally relates to synthetic soil and, more particularly to a blend of materials which can be used as a plant-growth medium, as a cover material for solid waste landfills or disturbed soil areas, and as a medium for treating contaminated water.

2. Background Art

Currently, solid waste disposal sites are typically covered with clay or another impermeable membrane such as strong plastic to keep rain water from infiltrating the waste and leaching out into the ground water. Such coverings are very expensive to install and maintain. The desirability of using synthetic soil materials in covering closed landfills and reclamation of disturbed soil areas such as mined, filled, and regraded land has recently been recognized. An article in the Post-Standard newspaper on Apr. 19, 1991 reported on a student proposal "to use processed bottom ash from an incinerator and some form of compost in a 1-to-30 ratio" (subsequently corrected to 1-to-3 ratio) as a waste bed cover.

Compost, for a long time has been used as a soil enriching material. Compost contains the nutrients used in relatively large quantities for plant growth. The earlier proposed waste bed cover accordingly employed compost as the primary ingredient.

Landfills and the disturbed soil areas often cover many acres and thus would require vast quantities of compost to implement the earlier proposal. Unfortunately, compost is not as readily available as municipal solid waste incinerator ash which today is produced in many locations and is typically disposed of in landfills.

Accordingly, a need still persists for a readily available and economically feasible alternative to the use of impermeable membranes in covering and vegetating solid waste landfills.

SUMMARY OF THE INVENTION

This need is satisfied and other benefits realized, in accordance with the principles of the present invention, by the provision of a residual biotech soil composition comprising a blend or mixture of one to nine parts of incinerator ash and one part of compostable organic material or compost, on a dry weight basis. Preferably, the blend contains a majority of incinerator ash, and most preferably, two to six parts of incinerator ash for every part of organic material. The incinerator ash may be unprocessed or processed and preferably is derived from incineration of municipal solid waste at a solid waste combustor or other waste-to-energy facility. The incinerator ash may include bottom ash and an admixture of fly ash. The compost is normally derived from composting organic solid waste. Combining incinerator ash and compost into such a synthetic soil mix to use as a barrier-protection layer and topsoil layer enclosing a landfill helps reduce waste and promotes a beneficial use of these two materials for supporting vegetative growth, provision of landfill covers and protection of disturbed soil areas. The mixture is also suitable as a medium for treating biologically and/or chemically contaminated water.

DESCRIPTION OF THE PREFERRED EMBODIMENTS

Although particular embodiments have been described herein, it will be readily apparent to those skilled in this art that various substitutions, modifications and the like may be made without departing from the spirit of the invention, the scope of which is defined by the claims appended hereto.

I claim:

1. A residual biotech soil composition comprising a blend of (a) two to nine parts of incinerator ash and (b) one part of compostable organic material or compost on a dry weight basis.

2. The residual biotech soil composition of claim 1 wherein the blend includes two to six parts of incinerator ash on a dry weight basis.

3. The residual biotech soil composition of claim 1 wherein the incinerator ash is derived from incineration of municipal solid waste.

4. The residual biotech soil composition of claim 3 wherein the incinerator ash comprises bottom ash.

5. The residual biotech soil composition of claim 4 wherein the incinerator ash further includes an admixture of fly ash.

6. The residual biotech soil composition of claim 1 wherein the incinerator ash is unprocessed.

7. The residual biotech soil composition of claim 1 wherein the incinerator ash comprises processed incinerator ash which has been processed according to at least one process selected from the group consisting of the following processes: wetting, drying, crushing, screening by size, and separating by material composition.

8. The residual biotech soil composition of claim 7 wherein the blend comprises a homogeneous blend of substantially five parts of processed bottom ash and one part compost derived from composting organic solid waste, on a dry weight basis.

9. A method for forming a residual biotech soil comprising the steps of:
   deriving incinerator ash from incineration of solid waste;
   providing compostable organic material or compost; and
   forming a substantially homogeneous blend of two to nine parts of said incinerator ash and one part of said compostable organic material or compost on a dry weight basis.

10. The residual biotech soil composition of claim 9 wherein the blend has a porosity substantially in the range of 50 to 60 percent.

11. The residual biotech soil composition of claim 2 wherein said blend comprises incinerator ash derived from incineration of municipal solid waste, and compost derived from composting organic solid waste.

12. A covering material for landfills and disturbed soil areas comprising the composition of claim 2.

13. A method for forming a residual biotech soil comprising the steps of:
   deriving incinerator ash from ircineration of solid waste;
   providing compostable organic material or compost; and
   forming a substantially homogeneous blend of one to nine parts of said incinerator ash and one part of said compostable organic material or compost on a dry weight basis.

14. A method of improving plant growth comprising applying the composition of claim 2 as a plant growth medium.

15. The method of claim 14 wherein the composition is placed at a depth of at least 60 centimeters and a dry bulk density of substantially one gram per cubic centimeter.

16. A residual biotech soil composition comprising a mixture of incinerator ash and compost, wherein the incinerator ash comprises a majority of the mixture on a dry weight basis.

17. The residual biotech soil composition of claim 16 wherein the mixture comprises at least five parts of incinerator ash and substantially one part compost.

* * * * *

UNITED STATES PATENT AND TRADEMARK OFFICE
CERTIFICATE OF CORRECTION

PATENT NO.    : 5,984,579
DATED         : November 16, 1999
INVENTOR(S)   : Richard J. McClimans It is certified that error appears in the above-identified patent and that said Letters Patent is hereby corrected as shown below:

<u>Column 2, claim 9,</u>
Lines 29-36, delete "A method for...weight basis" and replace with -- The residual biotech soil composition of claim 2 wherein said blend has an efective PH of from 7 to 9.5 --.

Signed and Sealed this

Twenty-fifth Day of December, 2001

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 5,984,579
DATED         : November 16, 1999
INVENTOR(S)   : Richard McClimians It is certified that error appears in the above-identified patent and that said Letters Patent is hereby corrected as shown below:

Column 2,
Line 50, delete "one to nine" and replace with -- two to nine --.

Signed and Sealed this

Thirteenth Day of August, 2002

Attest:

JAMES E. ROGAN
Attesting Officer    Director of the United States Patent and Trademark Office